United States Patent
Natili

(10) Patent No.: US 6,487,057 B1
(45) Date of Patent: Nov. 26, 2002

(54) GROUND FAULT CURRENT INTERRUPTER/ARC FAULT CURRENT INTERRUPTER CIRCUIT BREAKER WITH FAIL SAFE MECHANISM

(75) Inventor: Thomas Edward Natili, Butler City, PA (US)

(73) Assignee: Eaton Corporation, Cleveland, OH (US)

( * ) Notice: Subject to any disclaimer, the term of this patent is extended or adjusted under 35 U.S.C. 154(b) by 212 days.

(21) Appl. No.: 09/592,693

(22) Filed: Jun. 13, 2000

(51) Int. Cl.[7] ................................................. H02H 3/00
(52) U.S. Cl. .................... 361/42; 361/114; 361/115; 361/93.1; 361/93.2; 335/18
(58) Field of Search .............................. 361/42, 45, 49, 361/114, 115, 93, 18

(56) References Cited

U.S. PATENT DOCUMENTS

| | | |
|---|---|---|
| 4,081,852 A | 3/1978 | Coley et al. |
| 4,788,621 A * | 11/1988 | Russell et al. ............... 361/115 |
| 4,884,048 A * | 11/1989 | Castonguay et al. .......... 335/18 |
| 5,214,560 A * | 5/1993 | Jensen ......................... 361/93 |
| 5,260,676 A | 11/1993 | Patel et al. |
| 5,301,083 A | 4/1994 | Grass et al. |
| 5,483,211 A | 1/1996 | Carrodus et al. |
| 5,510,759 A | 4/1996 | Gula et al. |
| 5,831,509 A | 11/1998 | Elms et al. |
| 5,999,385 A | 12/1999 | Fello et al. |

* cited by examiner

Primary Examiner—Stephen W. Jackson
Assistant Examiner—Michael Smith
(74) Attorney, Agent, or Firm—Martin J. Moran

(57) ABSTRACT

A circuit breaker includes a pair of separable contacts forming a pole, an operating mechanism for operating the electrical contacts, an electronic trip circuit responsive to currents flowing through the pole for operating the operating mechanism in response to predetermined current conditions to open the separable contacts, and a fail-safe mechanism for operating the operating mechanism in response to a failure in the electronic trip circuit. The fail-safe mechanism includes a solenoid that is electrically connected to be energized in response to a failure in the electronic trip circuit and a linkage that operates the operating mechanism in response to operation of the solenoid. An operating arm that moves in response to the solenoid, interacts with operating mechanism to prevent resetting of the operating mechanism following actuation of the solenoid.

5 Claims, 4 Drawing Sheets

GROUND FAULT CURRENT INTERRUPTER/ ARC FAULT CURRENT INTERRUPTER CIRCUIT BREAKER WITH FAIL SAFE MECHANISM

BACKGROUND OF THE INVENTION

This invention relates to ground fault current interrupter and arc fault current interrupter circuit breakers and more particularly to such circuit breakers having a mechanism for opening the associated circuit in the event of a failure in the ground fault or arc fault trip circuit.

In small circuit breakers, commonly referred to as miniature circuit breakers, used for residential and light industrial applications, overcurrent protection is typically provided by a thermal-magnetic trip device. This trip device typically includes a bimetal strip that is heated and bends in response to a persistent overload condition. The bimetal, in turn, unlatches a spring powered operating mechanism that opens the separable contacts of the circuit breaker to interrupt current flow in the protected power system.

For short circuit protection, an armature, which is attracted by the sizable magnetic forces generated in a magnetic core by a short circuit, unlatches, or trips, the operating mechanism. As an example, the magnetic type actuation occurs when the hot line conductor becomes directly connected with ground or neutral, thereby bypassing the load. In many applications, a miniature circuit breaker may additionally provide ground fault and arc fault protection.

Ground fault current interrupter (GFCI) and arc fault current interrupter (AFCI) circuit breakers are well known in the art. Examples of ground fault and arc fault circuit breakers are disclosed in U.S. Pat. Nos. 4,081,852; 5,260, 676; 5,293,522; 5,896,262; and 5,892,593. In ground fault circuit breakers, an electronic circuit typically detects leakage of current to ground and generates a ground fault trip signal. This trip signal energizes a trip solenoid, which unlatches the operating mechanism, often through deflection of the armature of the thermal-magnetic trip device.

Ground fault circuit breakers include both Class A (e.g., ground fault current of about 5 mA for people protection) and equipment protective devices (e.g., ground fault current of about 30 mA). A common type of ground fault detection circuit is the dormant oscillator detector including first and second sensor coils. The line and neutral conductors of the protected circuit pass through the first sensor coil. The output of this coil is applied through a coupling capacitor to an operational amplifier followed by a window comparator having two reference values. A line-to-ground fault causes the magnitude of the amplified signal to exceed the magnitude of the reference values and, thus, generates a trip signal. At least the neutral conductor of the protected circuit passes through the second sensor coil. A neutral-to-ground fault couples the two detector coils which causes the amplifier to oscillate, thereby resulting in the generation of the trip signal.

In conventional ground fault circuit breakers, the ground fault detection circuit is powered from the load side of the circuit breaker such that the ground fault detection circuit is not powered after the circuit breaker has detected a ground fault and, thus, has tripped. In this manner, the circuit breaker separable contacts are employed as a cut-off switch to remove power to the ground fault detection circuit and, thus, protect such detection circuit.

In the event of a failure in the electronic trip circuit, such as a component failure that disables the electronic trip circuit, the circuit breaker can remain energized after the failure. It is desirable to provide a fail-safe mechanism that would open the contacts of the breaker in the event of such failure. It is further desirable to provide a means for preventing resetting of the circuit breaker once the contacts have been opened as a result of such failure.

SUMMARY OF THE INVENTION

A circuit breaker includes a pair of separable contacts forming a pole, an operating mechanism for operating the electrical contacts, an electronic trip circuit responsive to currents flowing through the pole for operating the operating mechanism in response to predetermined conditions to open the separable contacts, and a mechanism for operating the operating mechanism in response to a failure in the electronic trip circuit. The mechanism may include a solenoid that is electrically connected to be energized in response to a failure in the electronic trip circuit and a linkage that operates the operating mechanism in response to operation of the solenoid.

When the electronic circuit breaker fails, voltage is transferred to an auxiliary solenoid, which will then activate the trip mechanism of the circuit breaker.

Circuit breakers constructed in accordance with this invention further include a mechanism for preventing resetting of the circuit breaker once the auxiliary solenoid has been activated. This disables the circuit breaker with the contacts in an open position.

DESCRIPTION OF THE PREFERRED EMBODIMENT

Figure 1:
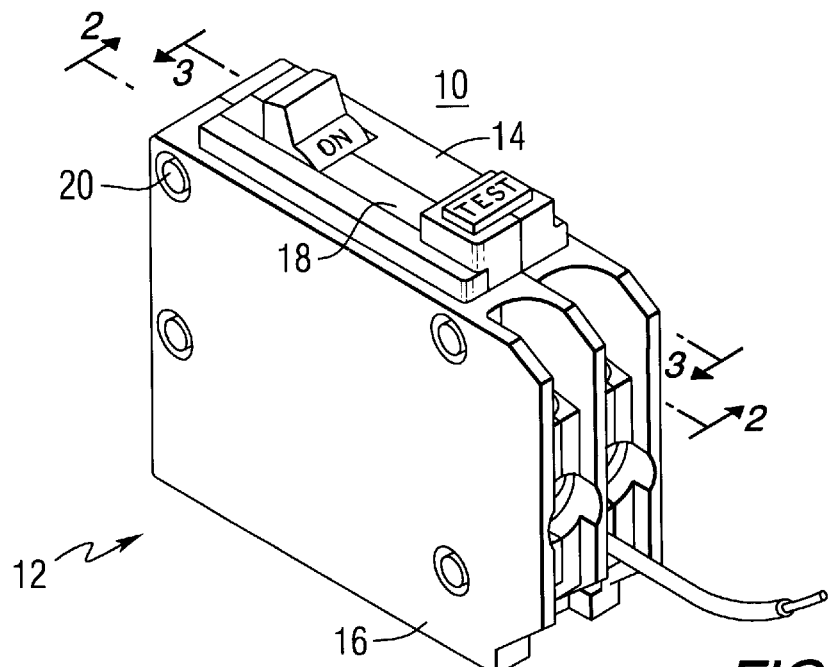
FIG. 1 is an isometric view of the ground fault circuit breaker structure of this invention.

Referring to the drawings, FIG. 1 is an isometric view of a ground fault circuit breaker that can be constructed in accordance with this invention. The circuit breaker 10 includes a housing 12, which is made of electrically insulating material such as a thermosetting resin. The housing 12 includes a pair of tray portions 14 and 16 and a side cover 18, which are secured in place by suitable means such as rivets 20 in a conventional manner. A circuit breaker operating mechanism is disposed within one compartment of housing 12 and a ground fault circuit interrupter is disposed within another compartment of housing 12.

Figure 2:
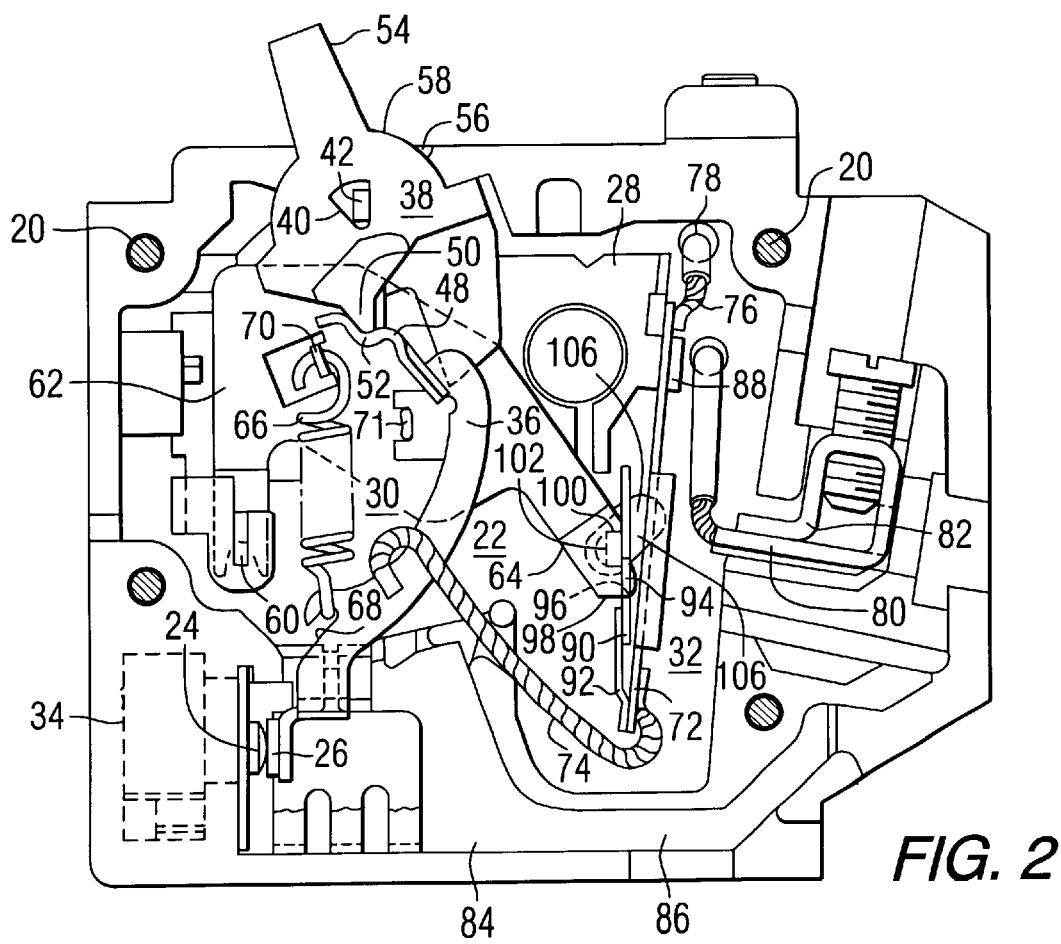
FIG. 2 is a vertical sectional view taken on the line 2—2 of FIG. 1 and showing the circuit breaker side of the invention and in the closed position.

FIG. 2 is a vertical sectional view taken on the line 2—2 of FIG. 1 and showing the operating mechanism of the circuit breaker with the contacts in the closed position. The circuit breaker mechanism 22 comprises a stationary contact 24, a movable contact 26, a supporting metal frame 28, an operating mechanism 30, and a trip device 32. The stationary contact 24 is welded, or otherwise secured to a clip-on line terminal 34 that is disposed within an opening or plug-in cavity to resiliently engage a blade in a load-center or panelboard when the circuit breaker is mounted in the operating position.

The stationary contact 24 cooperates with the movable contact 26 that is welded or otherwise secured to a small flange portion of a flat metallic generally C-shaped contact arm 36. Means for operating the contact arm 36 to the open and closed positions comprises an operating member indicated generally at 38 having a V-shaped opening 40 therein, which opening receives a projection 42 of the stationary metallic frame 28. The operating member 38 is biased outwardly or upward, to a position wherein the lower edges of the projection 42 pivotally engage the lower sidewalls of the V-shaped opening 40. The contact arm 36 is bent over at its upper end at 48, and a slot is provided in the part 50. Depressions 52 are formed in the part 50 on opposite sides of the slot. When the parts are in operating position, a molded projection integral with the operating member 38 extends into the slot of the contact arm 36 to position the operating member 38 relative to the contact arm 36, and pivoting portions 50 on opposite sides of the projection pivotally engage in the depressions 52 of the contact arm 36. The operating member 38 has a handle portion 54 molded integral therewith which extends through an opening 56 in the housing, whereby the mechanism may be manually operated to open and close the breaker. Arcuate surfaces 58 on opposite sides of the handle 54 substantially close the opening 56 in all positions of the operating member 38. Motion is transmitted from the operating member 38 to the contact arm 36 when the breaker is manually operated and from the contact arm 36 to the operating member 38 when the breaker is automatically tripped.

The frame 28 supports an insulating pivot 60. A releasable member 62 is pivotally supported at one end thereof on the pivot 60. The other end 64 of the releasable member 62 is latched by the trip device 32. The ends of the releasable member 62 are offset and disposed along a plane which is parallel to a plane in which the main body portion of the releasable member 62 is disposed. A spring 66 is connected, under tension, at one end in a slot 68 in contact arm 36, and at the other end in a slot projection 70 that extends from the main body portion of the releasable member 62.

The contact arm 36 is electrically connected to the lower end of a bimetal 72 by means of a flexible conductor 74. The bimetal 74 is part of the trip device 32. A flexible conductor 76 connects the upper end of the bimetal 72 with a terminal strap 78 that extends through an opening in the end wall of the housing. A terminal connector 80 is connected to the external end of the terminal strap 82 to permit connection of the circuit breaker in a circuit in a manner well known in the art. The closed circuit through the circuit breaker 10 extends from the terminal 34 through the stationary contact 24, movable contact 26, contact arm 36, flexible conductor 74, current-carrying bimetal 72, flexible conductor 76, to the terminal strap 78 by means of the terminal connector 80. Since the movable contact arm 36 extends downwardly from its pivot, the arc is established adjacent the bottom of the housing in an arc chamber 84 which is connected by a vent passage 86 to an opening in the end of the housing beneath the terminal connector 80.

When the releasable member 62 is in the latched position shown in FIG. 2, the circuit breaker may be manually operated by operation of the operating member 38. Movement of the operating member 38 in a clockwise direction switches the contacts from the "on" or closed position shown in FIG. 2 to the "off" or open position. The spring 66 biases the contact arm 36 upward into engagement with the operating member 38 to bias the operating member 38 against the lower edges of the projection 42 about which the operating member 38 pivots. Movement of the operating member 38 in a counterclockwise direction from the "off" position to the "on" position seen in FIG. 2 moves the upper end of the switch arm to the right of the line of action of the spring 66 to move the contact arm 36 to the closed position.

The trip device 30 comprises the elongated bimetal 72. The bimetal 72 is a flat member that is secured at the upper end thereof to a projection 88 of the stationary frame 28. The frame 28 is a flat member that is secured in place in the housing between projections of the molded insulating housing and the projection 88, which extends over to extend and in a direction generally normal to the plane of the flat supporting plate 28. An elongated rigid magnetic armature or latch member 90 is mounted on a spring 92 that is welded to the high expansion side of the bimetal 72. The armature 90 extends upward along the high expansion side of the bimetal 72 in a parallel relationship with the bimetal 72 when the bimetal is in the cold or straightened condition. The armature 90 has an opening 94 therein to form a latch surface 96 at the base of the opening. The latch end 64 of the releasable member 62 is formed with a latch surface 98 thereon and a stop surface or fulcrum part 100 thereon. The armature 90 serves as a stop to engage the fulcrum part 100 of the releasable member 62 in the latched position of the releasable member. A magnetic member 102 is mounted on the bimetal 72.

The circuit breaker is shown in FIG. 2 in the reset position wherein the releasable member 62 is latched on the armature 90. The circuit breaker can be manually operated only when the releasable member 62 is in the reset or latched position. In the position seen in FIG. 2, the bimetal 72 is based toward the releasable member 62 and engages the fulcrum part 100 of the rigid releasable member 62. In this position, the latch surface 98 of the releasable member 62 rests on the latch surface 96 of the armature 90 to latch the releasable member 62 thereby preventing clockwise movement of the releasable member 62 about the pivot 60. The high expansion side of the bimetal 72 is on the left as seen in FIG. 2. Upon the occurrence of a sustained lesser overload current above a first predetermined value, the bimetal 72, which is heated by the current flowing therethrough, deflects from the position seen in FIG. 2 to a thermally-tripped position. The bias of the complete bimetal 72 toward the left maintains the armature 90 against the fulcrum part 100 during the deflection of the bimetal 72 to a thermally tripped position. The bimetal 72 deflects to a curvature such as that during movement when the rigid armature 90 is angled to the position with the lower end of the rigid armature 90 being carried by the lower end of the bimetal 72, and the armature 90 moves about the fulcrum part 100 with a levering action to move the latch surface 96 of the armature 90 free of the latch 98 of the releasable member 62 to thereby release the releasable member 62.

When the releasable member 62 is released, the spring 66 acts to rotate the releasable member 62 in a clockwise direction about the pivot 60 until the releasable member 62 is stopped by engagement thereof with a molded projection on the housing part. During this movement, the line of action of the spring 66 moves to the right on the pivot 50, 52, whereupon the spring 66 biases the contact arm 36 in the opening direction and moves the contact arm 36 so that the line of action of the force exerted by the spring on the operating member 38 shifts across the pivot 40, 42 and actuates the operating member 38 to the tripped position. The tripped position of the operating member 38 is intermediate the "on" and "off" positions. The operating member 38 is stopped in the intermediate or tripped position when an insulating projection thereon engages the projection 70 on the releasable member 62. The contact arm 36 is stopped in the open position when it engages an insulating projection molded integral with the partition wall. Positive separation of the contacts is provided during a tripping operation by means of a projection 71 extending from the releasable member 62. If the contacts are slow in opening due to sticking, drag or other reasons, the projection engages the inner edge of the contact arm 36 to start the contact arm in the opening direction. The circuit breaker is trip-free in that the breaker will automatically trip open even if the handle 54 is held in the closed position.

The circuit breaker is instantaneously tripped upon the occurrence of a short circuit or severe overload current above a second predetermined value, higher than the first predetermined value, by operation of the magnetic trip of the trip means 32. As can be understood with reference to FIG. 2, the current passing through the bimetal 72 generates magnetic flux which operates through the armature 90, the air gaps between the armature 90 and the magnetic member 102, and through the stationary magnetic member 106. When the current reaches the second predetermined value, this magnetic flux is strong enough to attract the armature 90 toward the stationary magnetic member 106, and the spring 92 flexes permitting the armature 90 and bimetal 72 to move as a unit to the magnetically-tripped position wherein the releasable member 62 is releasable to trip the breaker in the same manner as was hereinbefore described. Following a magnetic tripping operation, the circuit breaker is reset and relatched in the same manner as was hereinbefore set forth with regard to the time-delay thermal tripping operation. The operating mechanism described above is more specifically described in the U.S. Pat. No. 4,081,852.

Figure 3:
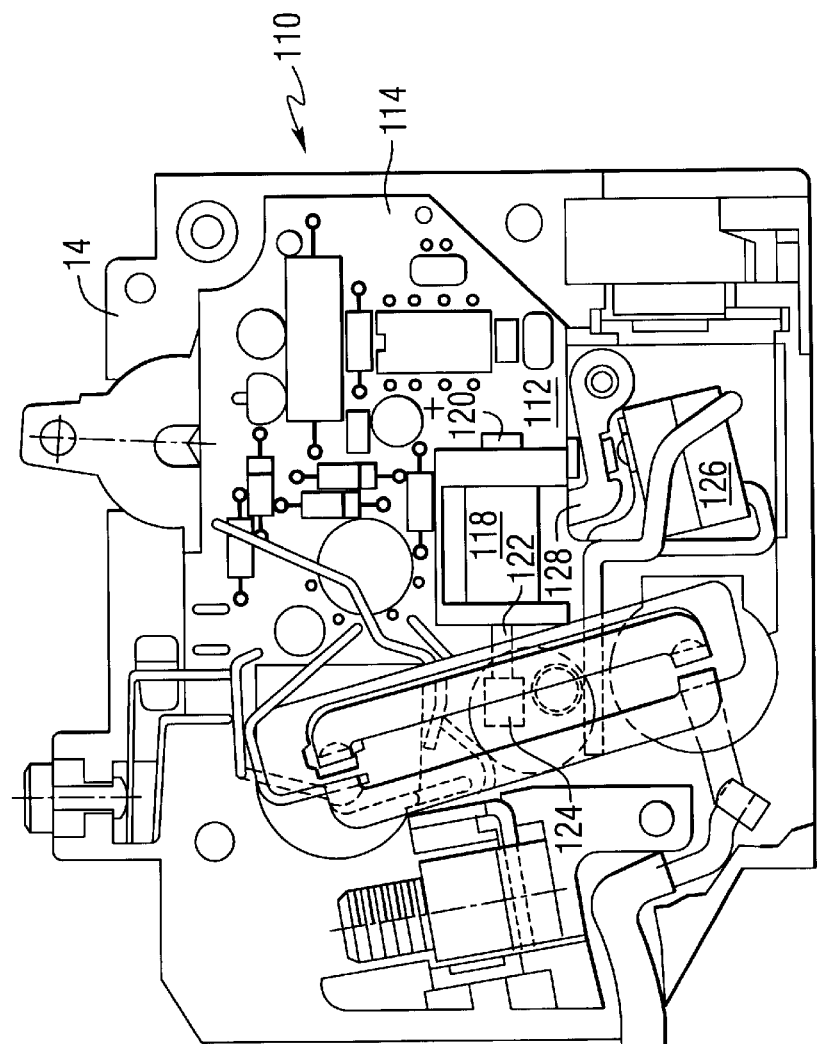
FIG. 3 is a vertical sectional view taken on the line 3—3 of FIG. 1 showing the electronic trip circuit side of the invention.

FIG. 3 is a vertical sectional view taken on the line 3—3 of FIG. 1 showing the ground fault detector side of the invention. Tray portion 14 includes a compartment 110 in which all of the components of the electronic trip device 112 are located. The printed circuit board (PCB) 114 on which the electronic circuit for ground fault protection is mounted is supported in the compartment 110. A pigtail 116 is provided in accordance with known practice for connection to a neutral conductor within the circuit breaker and to a neutral bar in a load center in which the circuit breaker may be mounted. As shown in U.S. Pat. No. 5,260,676, the ground fault trip circuit can use a pair of sensing coils (not shown) that encompass a conductor of the pole of the circuit breaker and a neutral conductor to provide a signal to the electronic circuit. When a ground fault condition is sensed, a solenoid 118 is energized, moving plunger 120. A finger 122 on one end of the plunger extends through an opening 124 in the tray and is coupled to the operating mechanism of the circuit breaker so that operation of the solenoid results in tripping of the circuit breaker.

In the event of a component failure in the electronic circuit, the ground fault detection capability of the breaker can be lost but the breaker contacts can remain energized. This invention trips the breaker in the event of such component failure. To achieve this function, circuit breakers constructed in accordance with the invention additionally include a means for operating said operating mechanism in response to a failure in said electronic trip circuit.

Figure 4:
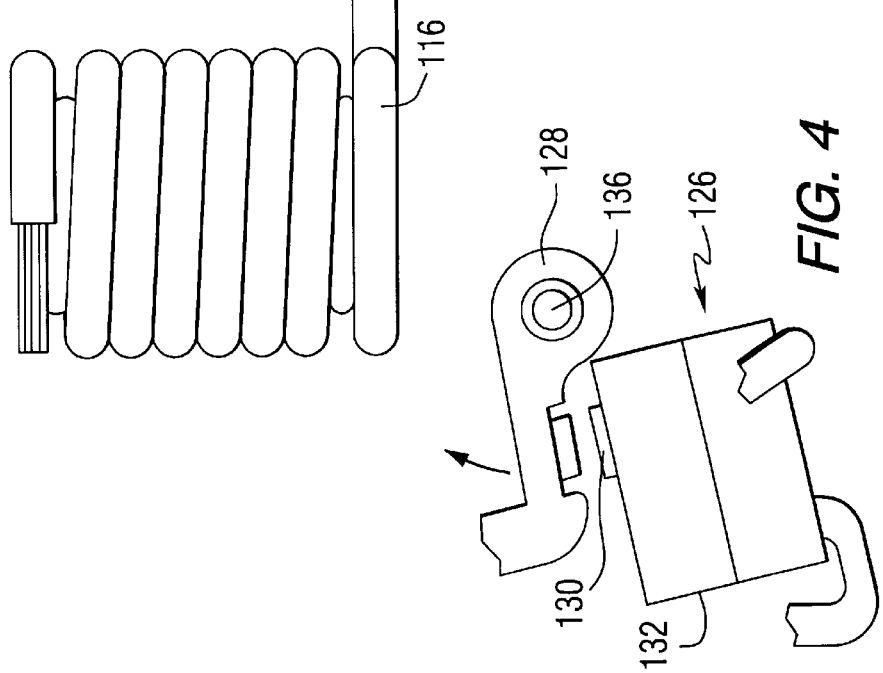
FIG. 4 is a side view of the solenoid used in the preferred embodiment of the invention.

In the preferred embodiment, the means for operating the operating mechanism in response to a failure in the electronic trip circuit includes a solenoid 126 and an operating arm 128 responsive to movement of a plunger 130 in the solenoid. As can be seen in FIG. 4, the solenoid 126 includes a plunger 130 mounted within a housing 132. In the event of a failure in the electronic trip circuit, the solenoid will be energized, thereby causing the plunger to move through an opening in the housing. Then the plunger will push the operating arm 128, causing it to pivot about pivot point 136.

This invention detects a failure of the main solenoid in the circuit breaker and locks the circuit breaker in an open position in response to such failure.

Figure 5:
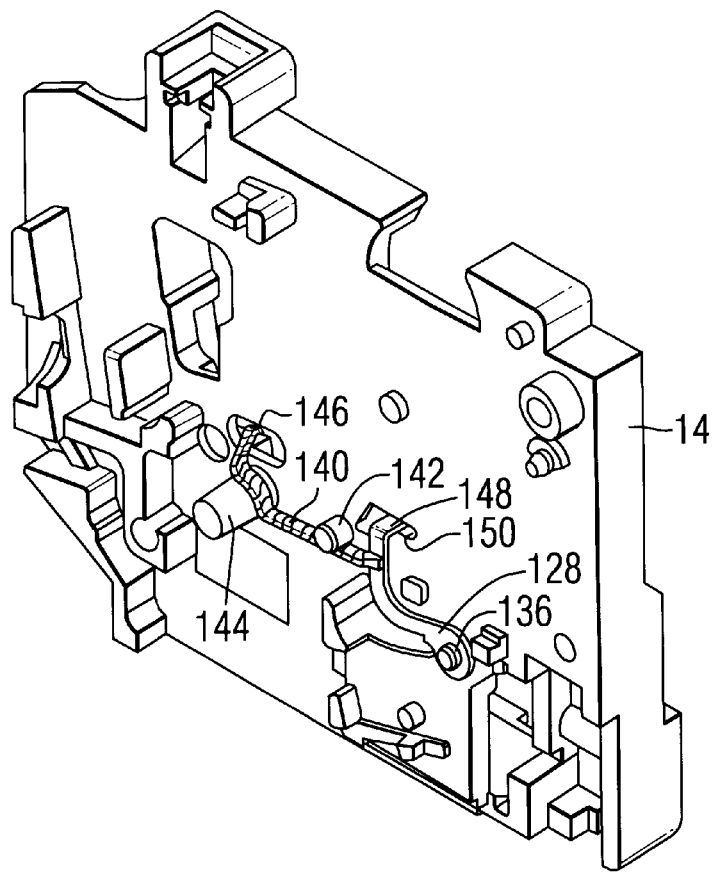
FIG. 5 is an isometric view of one of the tray portions of the breaker of FIG. 1.

FIG. 5 is an isometric view of the tray 14. The operating arm 128 is shown to be connected to a cable 140 that passes around first and second pulleys 142 and 144. A hook 146 at the end of the cable is coupled to the armature of the breaker operating mechanism shown in FIG. 2. When the plunger in assembly 126 (of FIG. 4) pushes against the arm 128, it pivots and pulls cable 140, such that the hook 146 moves the armature to a position that results in the opening of the breaker contacts.

Figure 6:
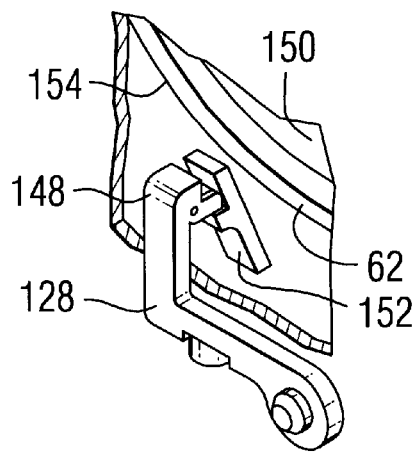
FIGS. 6, 7 and 8 are pictorial drawings of a portion of the latching mechanism of the invention.
Figure 7:
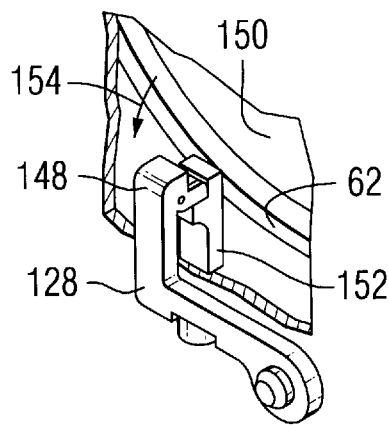
Figure 8:
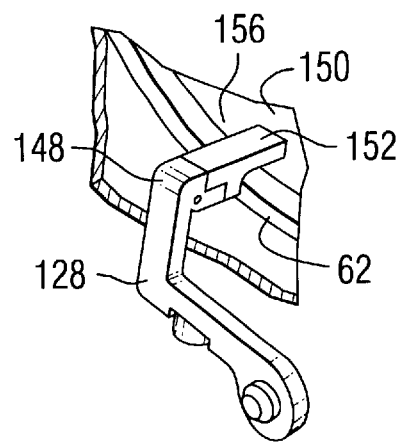
Figure 9:
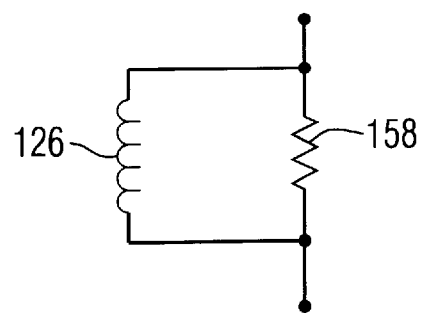
FIG. 9 is a schematic diagram of a portion of the electronic trip circuit and the solenoid used in the preferred embodiment of the invention.

The pulleys hold the cable in place and also serve as pivot points. The force exerted on the arm is transferred to the hook via the pulleys. The hook in turn pushes on the armature to trip the breaker. As the arm 128 pivots around pivot point 136, the end 148 of the arm moves within an opening 150 in the tray 14. The end 148 of the arm includes a hinged tab 152 that can move from a first position that is approximately perpendicular to the plane of the arm to a second position that is approximately parallel to the plane of the arm. FIGS. 6, 7 and 8 are detail drawings showing the end 148 of the arm 128 in relation to a portion of the releasable member 62, and are used to illustrate the manner in which the invention latches the trip mechanism to prevent resetting of the mechanism after actuation of the fail safe mechanism. FIG. 6 shows the position of the end of arm 128 prior to operation of the fail safe trip mechanism. In FIG. 6, the tab 150 at the end of the arm 128 is shown to be positioned adjacent to an outer surface 154 of the releasable member. In this position, the hinged tab is positioned in a plane approximately perpendicular to the plane of the arm 128.

FIG. 7 shows the position of the end of arm 128 during operation of the fail safe trip mechanism. Arrow 154 shows the direction of movement of releasable member 62 during the trip operation. At the time illustrated in FIG. 7, the hinged tab 152 on the has been deflected by the releasable member so that the tab lies in a plane substantially parallel to the plane of the arm 128.

FIG. 8 shows the position of the end of arm 128 after operation of the fail safe trip mechanism. At the time illustrated in FIG. 8, the hinged tab 152 has passed over an opening or slot 156 in the releasable member so that the tab returns to the plane that is approximately perpendicular to the plane of the arm 128. In this position, the tab 152 prevents the releasable member from returning to its original position, thereby preventing resetting of the circuit breaker. This permanently disables the circuit breaker.

As previously stated, when a failure of the electronic trip circuit occurs, voltage is transferred to the auxiliary solenoid 126 to activate the solenoid and cause the operation of the fail safe mechanism. In the preferred embodiment, of a resistor 158 in the electronic trip device 112 is sized such that it is subjected to an over voltage condition upon a failure in the electronic trip circuit. This causes the resistor to fail in an electrically open mode, thereby sending sufficient voltage to an auxiliary solenoid to operate the solenoid. The solenoid then moves plunger 120, which activates the fail safe trip mechanism of the circuit breaker. This trips the circuit breaker and disables the resetting mechanism as described above.

While the present invention has been described in terms of what is believed to be its preferred embodiment, it will be apparent to those skilled in the art that various changes may be made to the embodiment shown in the drawings without departing from the scope of the invention that is defined by the following claims.

What is claimed is:

1. A circuit breaker comprising:

a pair of separable contacts forming a first pole;

an operating mechanism for operating said electrical contacts;

electronic trip circuit responsive to currents flowing through said first pole for operating said operating mechanism in response to predetermined current conditions to open said separable contacts;

means for operating said operating mechanism in response to a failure in said electronic trip circuit;

wherein said means for operating said operating mechanism in response to a failure in said electronic trip circuit comprises:

a solenoid electrically connected to said electronic trip circuit, said solenoid being energized in response to said failure in said electronic trip circuit;

a plunger in said solenoid;

a linkage assembly for operating said operating mechanism in response to movement of said plunger;

wherein said linkage assembly comprises:

an operating arm pivotally mounted adjacent to said solenoid such that movement of said plunger causes said operating arm to pivot about a pivot point; and a cable connecting said operating arm to said operating mechanism for operating said electrical contacts, whereby movement of said operating arm causes said operating mechanism to open said contacts.

2. The circuit breaker of claim 1 wherein said operating arm includes an end portion, whereby movement of said operating arm causes said end portion to prevent resetting of said operating mechanism.

3. The circuit breaker of claim 2 further comprising a hinge connecting said end portion to said operating arm.

4. A circuit breaker comprising:

a pair of separable contacts forming a first pole;

an operating mechanism for operating said electrical contacts;

electronic trip circuit responsive to currents flowing through said first pole for operating said operating mechanism in response to predetermined current conditions to open said separable contacts;

means for operating said operating mechanism in response to a failure in said electronic trip circuit;

wherein said means for operating said operating mechanism in response to a failure in said electronic trip circuit comprises:

a solenoid electrically connected to said electronic trip circuit, said solenoid being energized in response to said failure in said electronic trip circuit;

a plunger in said solenoid;

a linkage assembly for operating said operating mechanism in response to movement of said plunger; and means for preventing resetting of said operating mechanism in response to said failure in said electronic trip circuit.

5. The circuit breaker of claim 4 wherein said operating mechanism includes a resettable member having an opening therein, and said means for preventing resetting of said operating mechanism comprises:

an operating arm pivotally mounted adjacent to said solenoid such that movement of said plunger causes said operating arm to pivot about a pivot point; and an end portion of said operating arm positioned to extend into said opening in said resettable member in response to movement of said plunger to prevent resetting of said resettable member.

* * * * *